(12) United States Patent
Fujii et al.

(10) Patent No.: US 10,507,645 B2
(45) Date of Patent: Dec. 17, 2019

(54) INKJET PRINTING APPARATUS AND INKJET PRINTING METHOD

(71) Applicants: Ichiroh Fujii, Kanagawa (JP); Hisashi Habashi, Kanagawa (JP)

(72) Inventors: Ichiroh Fujii, Kanagawa (JP); Hisashi Habashi, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 16/035,013

(22) Filed: Jul. 13, 2018

(65) Prior Publication Data

US 2018/0319158 A1 Nov. 8, 2018

Related U.S. Application Data

(63) Continuation of application No. PCT/JP2017/001763, filed on Jan. 19, 2017.

(30) Foreign Application Priority Data

Jan. 19, 2016 (JP) .................. 2016-007759

(51) Int. Cl.
*B41J 2/045* (2006.01)
*B41J 2/14* (2006.01)
(Continued)

(52) U.S. Cl.
CPC ............. *B41J 2/045* (2013.01); *B41J 2/1433* (2013.01); *B41J 2/1606* (2013.01); *C09D 11/328* (2013.01); *C09D 11/38* (2013.01)

(58) Field of Classification Search
CPC ........ B41J 2/045; B41J 2/1433; B41J 2/1606; C09D 11/38; C09D 11/328
(Continued)

(56) References Cited

U.S. PATENT DOCUMENTS

| 5,142,374 A | 8/1992 | Tajika et al. |
| 2004/0041875 A1 | 3/2004 | Yazawa et al. |

(Continued)

FOREIGN PATENT DOCUMENTS

| CN | 1927588 A | 3/2007 |
| EP | 1 759 853 A1 | 3/2007 |

(Continued)

OTHER PUBLICATIONS

Extended European Search Report dated Jan. 2, 2019 in the corresponding European Application No. 17741488.5.
(Continued)

*Primary Examiner* — Stephen D Meier
*Assistant Examiner* — Alexander D Shenderov
(74) *Attorney, Agent, or Firm* — Oblon, McClelland, Maier & Neustadt, L.L.P.

(57) ABSTRACT

Provided is an inkjet printing apparatus, satisfying elements (1) through (4) below,
(1) the inkjet printing apparatus including an ink discharging unit configured to discharge an ink,
(2) the ink discharging unit including an inkjet head having a nozzle diameter of 17 μm or greater but 19 μm or less,
(3) the inkjet head including a nozzle plate and an ink repellent layer disposed on a surface of the nozzle plate, and
(4) the inkjet printing apparatus using, as the ink, an aqueous dye ink including a water-soluble dye and having a viscosity of 5 mPa·s or greater but 12 mPa·s or less at 25° C.

16 Claims, 7 Drawing Sheets

(51) Int. Cl.
*B41J 2/16* (2006.01)
*C09D 11/328* (2014.01)
*C09D 11/38* (2014.01)

(58) Field of Classification Search
USPC .......................................................... 347/29
See application file for complete search history.

(56) References Cited

U.S. PATENT DOCUMENTS

| | | | | |
|---|---|---|---|---|
| 2006/0044375 | A1* | 3/2006 | Taguchi | C09D 11/328 347/100 |
| 2007/0057997 | A1 | 3/2007 | Mizutani | |
| 2007/0247492 | A1* | 10/2007 | Mori | B41J 2/1433 347/45 |
| 2008/0094458 | A1* | 4/2008 | Bannai | B41J 2/17513 347/100 |
| 2012/0236066 | A1 | 9/2012 | Tamai et al. | |
| 2013/0342604 | A1 | 12/2013 | Yamashita et al. | |
| 2017/0043580 | A1 | 2/2017 | Takagi et al. | |

FOREIGN PATENT DOCUMENTS

| | | |
|---|---|---|
| JP | 64-001545 | 1/1989 |
| JP | 05-046744 | 7/1993 |
| JP | 10-006494 | 1/1998 |
| JP | 2859296 | 12/1998 |
| JP | 2000-141655 | 5/2000 |
| JP | 2004-090233 | 3/2004 |
| JP | 2012-207210 | 10/2012 |
| JP | 2014-025055 | 2/2014 |
| JP | 2014-148592 | 8/2014 |
| JP | 2014-148608 | 8/2014 |
| JP | 2015-017187 | 1/2015 |
| JP | 2015-221541 | 12/2015 |
| WO | WO 2015/178010 A1 | 11/2015 |

OTHER PUBLICATIONS

International Search Report dated Apr. 11, 2017 for counterpart International Patent Application No. PCT/JP2017/001763 filed Jan. 19, 2017(with English Translation).
Written Opinion dated Apr. 11, 2017 for counterpart International Patent Application No. PCT/JP2017/001763 filed Jan. 19, 2017.
Office Action dated May 13, 2019 in Chinese Patent Application No. 201780007106.6 (with English translation), 11 pages.
Combined Office Action and Search Report dated May 31, 2019 in Russian Patent Application No. 2018129881 (with English translation), 14 pages.
Office Action dated May 14, 2019 in Japanese Patent Application No. 2017-562892, 5 pages.

* cited by examiner

INKJET PRINTING APPARATUS AND INKJET PRINTING METHOD

CROSS-REFERENCE TO RELATED APPLICATIONS

The present application is a continuation application of International Application No. PCT/JP2017/001763, filed Jan. 19, 2017, which claims priority to Japanese Patent Application No. 2016-007759, filed Jan. 19, 2016. The contents of these applications are incorporated herein by reference in their entirety.

BACKGROUND OF THE INVENTION

Field of the Invention

The present disclosure relates to an inkjet printing apparatus and an inkjet printing method.

Description of the Related Art

An inkjet printing method is a method where ink droplets are deposited on a printing medium to perform printing. Since this method has a simple printing process, multiple color printing can be performed at low cost. The method is non-contact printing, hence overprint can be realized and printing quality is easily improved and high speed printing can be performed without any noise. Therefore, the above-mentioned method has been widely used for from printers for domestic use to industrial printers.

Satisfactory image quality of from letter images through photographic images can be obtained by the inkjet printing method. Therefore, the inkjet printing method has been widely used as a method for outputting photographs instead of silver halide photograph, owing to recent popularization of digital cameras and scanners. Along with this trend, users have desired coloring of a printed output image close to coloring on a display in order to compare an image on a computer display with the printed output image and therefore image quality exceeding image quality of silver halide photographs has been desired.

As photographic image quality of inkjet printing, it is particularly desired that granularity is prevented as well as obtaining high resolution and gradation. Therefore, proposed is a method for achieving gradations using 2 types of inks having the identical hue but mutually different dye concentrations (see, for example, Japanese Unexamined Patent Application Publication No. 64-1545, Japanese Patent No. 1839472, and Japanese Patent No. 2859296).

Moreover, minimization of ink droplets has been studied in order to achieve high image quality. For example, in Japanese Unexamined Patent Application Publication No. 2000-141655, the invention where diameters of ink supply holes are made to be 30 μm or less is disclosed.

In Japanese Unexamined Patent Application Publication No. 2004-90233 furthermore, the invention where diameters of ink discharge openings of a nozzle are made to be 12 μm or greater but 22 μm or less is disclosed.

SUMMARY OF THE INVENTION

According to one aspect of the present disclosure, an inkjet printing apparatus satisfies elements (1) through (4) below,
(1) the inkjet printing apparatus including an ink discharging unit configured to discharge an ink,
(2) the ink discharging unit including an inkjet head having a nozzle diameter of 17 μm or greater but 19 μm or less,
(3) the inkjet head including a nozzle plate and an ink repellent layer disposed on a surface of the nozzle plate, and
(4) the inkjet printing apparatus using, as the ink, an aqueous dye ink including a water-soluble dye and having a viscosity of 5 mPa·s or greater but 12 mPa·s or less at 25° C.

Figure 1:
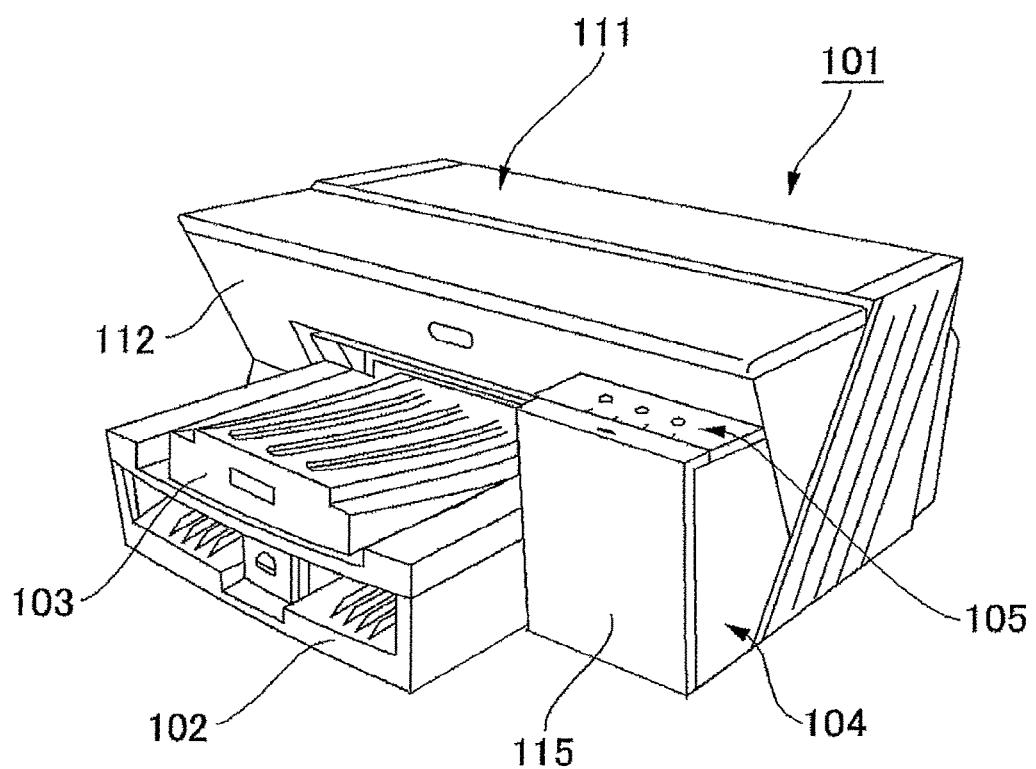
FIG. 1 is a perspective explanatory view illustrating one example of an inkjet printing apparatus of the present disclosure.

DESCRIPTION OF THE EMBODIMENTS (Inkjet Printing Apparatus and Inkjet Printing Method)

An inkjet printing apparatus of the present disclosure satisfies elements (1) through (4) below:
(1) the inkjet printing apparatus including an ink discharging unit configured to discharge an ink,
(2) the ink discharging unit including an inkjet head having a nozzle diameter of 17 μm or greater but 19 um or less,
(3) the inkjet head including a nozzle plate and an ink repellent layer disposed on a surface of the nozzle plate, and
(4) the inkjet printing apparatus using, as the ink, an aqueous dye ink including a water-soluble dye and having a viscosity of 5 mPa·s or greater but 12 mPa·s or less at 25° C.

An inkjet printing method of the present disclosure satisfies elements (1) through (4) below:
(1) the inkjet printing method including an ink discharging step that includes discharging an ink to print an image,
(2) the inkjet discharging step using an inkjet head having a nozzle diameter of 17 μm or greater but 19 μm or less,
(3) the inkjet head including a nozzle plate and an ink repellent layer disposed on a surface of the nozzle plate, and
(4) the inkjet printing method using, as the ink, an aqueous dye ink including a water-soluble dye and having a viscosity of 5 mPa·s or greater but 12 mPa·s or less at 25° C.

The present disclosure has an object to provide an inkjet printing apparatus capable of stably discharging small droplets and printing an image of high resolution with no granularity, without using a plurality of inks (dark and light inks) having the identical color but having mutually different dye concentrations.

Note that, in the present specification, the phrase "no granularity" means image quality that an image is smooth and cannot be visually recognized as dots.

The present disclosure can provide an inkjet printing apparatus capable of stably discharging small droplets and printing an image of high resolution with no granularity without using dark and light inks.

The invention where diameters of ink supply holes are made to be 30 µm or less is disclosed in Japanese Unexamined Patent Application Publication No. 2000-141655 (PTL 4). Understanding from the description of the paragraph [0022] thereof, there is no intention that the ink supply holes are made to be 20 µm or less and optimization with the ink has not been attempted.

In Japanese Unexamined Patent Application Publication No. 2004-90233 (PTL 5), moreover, the invention where nozzle diameters are made to be 12 µm or greater but 22 µm or less is disclosed, but the nozzle diameter of Example is 20 µm, which is different from the present disclosure. Moreover, the ink for use is "an ink substantially free from a volatile component, i.e., an ink, in which an amount of water or an organic solvent having a boiling point of 150° C. or lower is less than 1% (the paragraph [0056] of Japanese Unexamined Patent Application Publication No. 2004-90233)," which is different from an aqueous dye ink for use in the present disclosure. Furthermore, the object of the invention disclosed is "high image quality is achieved by discharging an ink with a small droplet amount without causing concentration unevenness or lowering quality of printed letters due to a blocked nozzle (the paragraph [0006] of Japanese Unexamined Patent Application Publication No. 2004-90233)," which is different from the object of the present disclosure that printing is performed with no granularity.

The inkjet printing method of the present disclosure can be suitably performed by the inkjet printing apparatus of the present disclosure. The ink discharging step can be suitably performed by the ink discharging unit. Moreover, the above-mentioned other steps can be suitably performed by the above-mentioned other units.

<Ink Discharging Unit (Ink Jetting Unit) and Ink Discharging Step (Ink Jetting Step)>

The ink discharging unit is a unit configured to discharge the ink to form an image.

The ink discharging step is a step including discharging the ink to form an image.

As the ink discharging unit, an inkjet head is preferably used.

<<Inkjet Head>>

The inkjet head includes a nozzle plate and may further include other members according to the necessity.

—Nozzle Plate—

The nozzle plate includes a nozzle substrate and the ink repellent layer disposed on the nozzle substrate.

Nozzle holes are formed in the nozzle substrate. A shape, size, material, and structure thereof are not particularly limited and may be appropriately selected.

The nozzle substrate has a plane of an ink-discharge side from which an ink is discharged through the nozzle holes and a liquid chamber joining plane positioned opposite to the plane of the ink-discharge side.

The ink repellent layer is formed on the plane of the ink-discharge side of the nozzle substrate.

A planar shape of the nozzle substrate is not particularly limited and may be appropriately selected. Examples of the planar shape include a rectangular shape, a square shape, a diamond shape, a circular shape, and an oval shape. Moreover, examples of a cross-sectional shape of the nozzle substrate include a flat board shape and a plate shape.

A size of the nozzle substrate is not particularly limited and may be appropriately selected according to the size of the nozzle plate.

A material of the nozzle substrate is not particularly limited and may be appropriately selected. Examples of the material include stainless steel, nickel, Al, Bi, Cr, InSn, ITO, Nb, $Nb_2O_5$, NiCr, Si, $SiO_2$, Sn, $Ta_2O_5$, Ti, W, ZAO(ZnO+$Al_2O_3$), and Zn. The above-listed examples may be used alone or in combination. Among the above-listed examples, stainless steel is preferable in view of anticorrosion.

The numbers, alignment, spacing, opening shapes, opening sizes, and cross-sectional shapes of the openings, etc. of the nozzle holes are not particularly limited and may be appropriately selected.

The alignment of the nozzle holes is not particularly limited and may be appropriately selected. Examples of the alignment include an embodiment where a plurality of the nozzle holes are aligned at even intervals along a length direction of the nozzle substrate.

The alignment of the nozzle holes is appropriately selected depending on a type of an ink to be discharged. The alignment is preferably from 1 line through several lines and more preferably from 1 line through 4 lines.

The number of the nozzle holes per line is not particularly limited and may be appropriately selected according to the intended purpose. The number of the nozzle holes per line is preferably from 10 through 10,000 and more preferably from 50 through 500.

A pitch P that is a minimum distance between centers of the nozzle holes next to each other is not particularly limited and may be appropriately selected. For example, the pitch P is preferably in the range of from 100 dpi through 1,200 dpi.

Opening shapes of the nozzle holes are not particularly limited and may be appropriately selected. Examples of the opening shapes include circles, ovals, and squares. Among the above-listed examples, circles are preferable in view of discharge of ink droplets.

The nozzle diameters are 17 µm or greater but 19 µm or less. When the nozzle diameters are 17 µm or greater but 19 µm or less, discharge stability improves and high resolution printing without granularity, which is one of the problems to be solved by the present disclosure, can be performed.

The nozzle plate is preferably a nozzle plate having a nozzle formed in a manner that a diameter of a nozzle reduces from the ink inlet side from which the ink of the liquid chamber inflows to the ink-discharge side at which the flown ink is discharged, and a cross-sectional shape of the nozzle is a curved shape and has a smoothly curved shape (round shape) because such a nozzle plate enables stable discharge of small droplets of the ink.

—Ink Repellent Layer—

The ink repellent layer is formed on a plane of an ink-discharge side of the nozzle substrate. A shape, structure, material, and thickness of the ink repellent layer are not particularly limited and may be appropriately selected.

A material of the ink repellent layer is not particularly limited as long as the material is a material that repels the ink. Examples of the material include silicone-based water repellent materials and fluorine-based water repellent materials. Among the above-listed examples, silicone-based water repellent materials are preferable.

Examples of the silicone-based water repellent materials include room temperature-curable liquid silicone resins or elastomers and ultraviolet ray-curable liquid silicone resins or elastomers.

Examples of the fluorine-based water repellent materials include heat-curable liquid silicone resins or elastomers.

Any of the above-listed materials is applied onto a surface of the nozzle substrate of the nozzle plate and is left in the atmosphere at room temperature to cure the material through polymerization, ultraviolet ray irradiation, or heating to form an ink repellent layer.

A viscosity of the silicone resin is preferably 1,000 mPa·s or less.

The silicone resin is a resin having, as a basic skeleton, a siloxane bond composed of Si and O. The silicone resin is commercially available in various forms, such as oil, resins, and elastomers. Other than ink repellency that is important for the present disclosure, the silicone resin has various characteristics, such as heat resistance, release properties, defoaming properties, and adhesion.

Examples of a commercial product of the silicone resin include room temperature-curable silicone resin, SR2411 (available from Dow Corning Toray Co., Ltd.).

In order to maintain sufficient ink repellency against an ink including a fluorine-based surfactant, moreover, an ink repellent layer is preferably composed of a structure including a silicone resin and/or a fluorine resin.

The structure including the silicone resin and/or the fluorine resin is composed of a silicone resin alone, a fluorine resin alone, or a mixture thereof with a constitutional component, such as another resin and a metal. Examples of the structure including the silicone resin and/or the fluorine resin include a structure where silicone resin particles are dispersed in a fluorine resin, a kneaded product of a silicone resin with polypropylene, and eutectoid plating of Ni with a silicone resin or a fluorine resin. A mixed body of a silicone resin and another constitutional component is effective for preventing dissolution of the silicone resin.

Apart from the above-described method for curing after coating and the above-described method of Ni eutectoid plating, as the method for forming the ink repellent layer on a surface of the nozzle plate, there are also an electrodeposition method of a fluorine resin, a vacuum vapor deposition method, and a method where silicone oil is polymerized through plasma polymerization.

When the ink repellent layer is formed by a method other than the electrodeposition method, nozzle holes and a back surface of the nozzle plate are masked with a photoresist, a water-soluble resin, etc., the resist is stripped and removed after forming an ink repellent layer to thereby form the ink repellent layer only on a surface of the nozzle plate. However, the ink repellent layer may be damaged when a strong alkaline stripping liquid is used and therefore attention should be paid.

An average thickness of the ink repellent layer is preferably from 0.1 µm or greater but 5.0 µm or less and more preferably from 0.1 µm or greater but 1.0 µm or less. When the average thickness is 0.1 µm or greater, resistance against wiping may not be deteriorated and reduction in ink repellency during a long-time use may not be caused. When the thickness is greater than 5.0 µm, moreover, the thickness is more than a necessary thickness, which increases a production cost.

Surface roughness (Ra) of the ink repellent layer is preferably 0.2 µm or less. When the surface roughness is 0.2 µm or less, residues from wiping can be reduced.

—Other Members—

The above-mentioned other members are not particularly limited and may be appropriately selected. Examples of the above-mentioned other members include pressurizing chamber and stimulus generating unit.

——Pressurizing Chamber——

The pressurizing chambers are disposed individually corresponding to a plurality of the nozzle holes in the nozzle plate, are a plurality of individual flow channels communicating to the nozzle holes, and may also be referred to as ink flow channels, pressurizing liquid chambers, pressure chambers, discharge chambers, or liquid chambers.

——Stimulus Generating Unit——

The stimulus generating unit is a unit configured to generate stimulus applying to the ink.

The stimulus of the stimulus generating unit is not particularly limited and may be appropriately selected. Examples of the stimulus include heat (temperature), pressure, vibrations, and light. The above-listed examples may be used alone or in combination. Among the above-listed examples, heat and pressure are suitably listed.

Examples of the stimulus generating unit include heating devices, pressurizing devices, piezoelectric elements, vibration generating devices, ultrasonic wave oscillators, and lights. Specific examples of the stimulus generating unit include: piezoelectric actuators, such as a piezoelectric element; thermal actuators utilizing a phase change caused by film boiling of an ink using a thermoelectric conversion element, such as a heating resistor; a shape memory alloy actuator using a metal phase change due to a temperature change; and an electrostatic actuator using electrostatic force.

In the case where the stimulus is "heat," for example, there is a method where thermal energy corresponding to a printing signal is applied to an ink inside the ink discharge head, for example, by means of a thermal head, etc. to generate bubbles in the ink due to the thermal energy and the ink is discharged as droplets from the nozzle holes of the nozzle plate by the pressure of the bubbles.

In the case where the stimulus is "pressure," for example, there is a method where voltage is applied to the piezoelectric element adhered to a location, so-called the pressure chamber, inside an ink flow channel in the ink discharge head to bend the piezoelectric element, and as a result, a volume inside the pressure chamber reduces to discharge the ink, as droplets, from the nozzle holes of the ink discharge head.

Among the above-listed examples, a piezo system where an ink is discharged by applying voltage to a piezo element is preferable.

A size of a droplet of the ink to be discharged is preferably from 1 pL through 7 pL in order to achieve photographic image quality. In order to achieve image quality without granularity, the size of the droplet is desirably as close as 1 pL. Moreover, speed of the discharge jet is preferably from 5 m/s through 20 m/s. The driving frequency of the discharge jet is preferably 1 kHz or greater. The resolution is preferably 300 dpi or greater.

<Other Steps and Other Units>

Examples of the above-mentioned other units include a heating unit and a controlling unit.

Examples of the above-mentioned other steps include a heating step and a controlling step.

The controlling unit is not particularly limited and may be appropriately selected, as long as the controlling unit is capable of controlling operations of each of the units. Examples of the controlling unit include devices, such as a sequencer and a computer.

The inkjet printing apparatus and inkjet printing method of the present disclosure are used for various types of printing according to an inkjet printing system. For example, the inkjet printing apparatus and inkjet printing method are particularly suitably used for inkjet printers, facsimile devices, copiers, printer/fax/copier multifunction peripherals, etc.

One example of the inkjet printing apparatus of the present disclosure will be described with reference to drawings.

An inkjet printing apparatus illustrated in FIG. 1 includes a device main body 101, a paper feeding tray 102 mounted in the device main body 101 and configured to load sheets, and a paper ejection tray 103 mounted in the device main body 101 and configured to stack sheets to which images have been printed (formed). A top surface of an upper cover 111 of the device main body 101 is a substantially flat surface, a front surface 112 of a front cover of the device main body 101 is inclined diagonally backwards relative to the top surface, and at the bottom side of the inclined front surface 112, a paper ejection tray 103 and paper feeding tray 102, which are projected forwards (the near side), are disposed. At the edge side of the front surface 112, an ink cartridge mounting unit 104 is disposed at a position that is projected forward from the front surface 112 and is lower than the upper cover 111, and a control unit 105, such as operation keys and a display, is arranged on a top surface of the ink cartridge mounting unit 104. The ink cartridge mounting unit 104 has a front cover 115 that can be opened or closed for performing attaching or detaching an ink cartridge.

Figure 2:
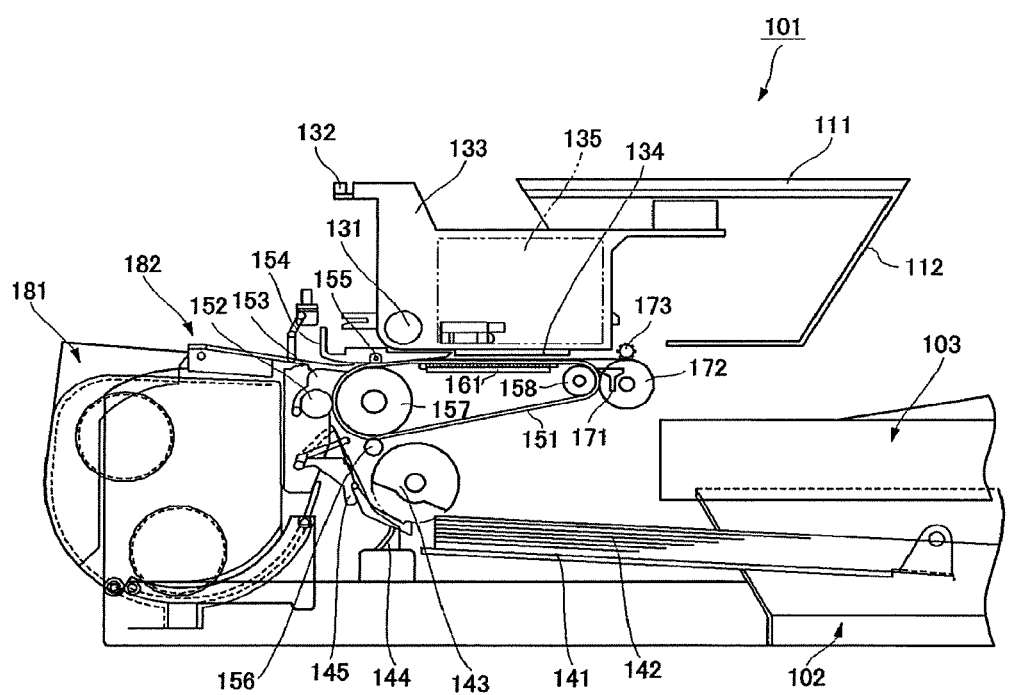
FIG. 2 is a schematic view illustrating one example of an entire structure of the inkjet printing apparatus of the present disclosure.
Figure 3:
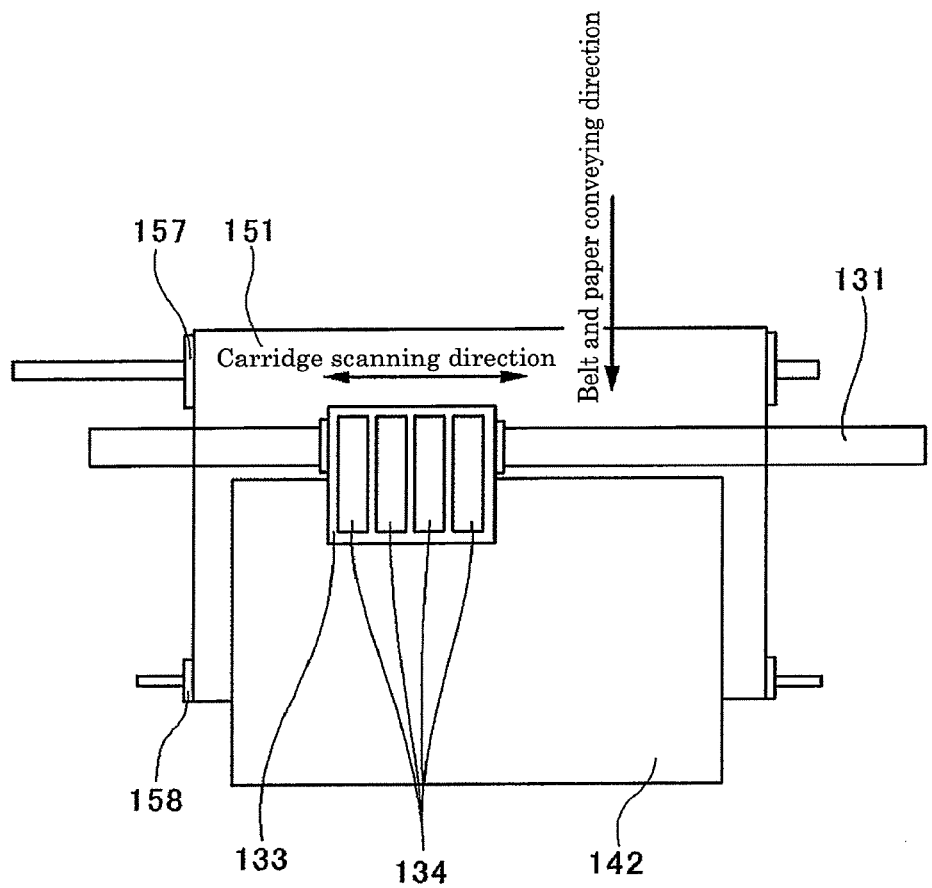
FIG. 3 is a schematic enlarged view illustrating one example of an inkjet head of the present disclosure.

In the device main body 101, as illustrated in FIGS. 2 and 3, a carriage 133 is held slidably in a main-scanning direction with a guide rod 131, which is a guide member laterally bridging left and right side plates (not illustrated) and a stay 132, and the carriage 133 is moved for scanning in the carriage scanning direction of FIG. 3 by a main scanning motor (not illustrated). A printing head 134 composed of four inkjet heads which discharge ink droplets of yellow, cyan, magenta, and black is mounted in the carriage 133 in a manner that a plurality of ink ejection openings of the printing head 134 are aligned in the direction intersecting the main-scanning direction and the ink droplet discharge direction faces downwards. Usable as each of the heads constituting the printing head 134 is a head including an energy generating unit configured to discharge ink, such as a piezoelectric actuator (e.g., a piezoelectric element), a thermal actuator utilizing a phase change due to film boiling of a liquid using a thermoelectric conversion element (e.g., a heating resistor), a shape memory alloy actuator using a metal phase change due to a temperature change, and an electrostatic actuator using electrostatic force.

Moreover, a subtank 135 of each color for supplying an ink of each color to the printing head 134 is also disposed in the carriage 133. An ink is supplied and replenished to the subtank 135 from the ink cartridge mounted in the ink cartridge mounting unit 104 via an ink supply tube (not illustrated).

Meanwhile, as a paper feeding unit configured to feed sheets 142 stacked on a sheet stacking unit (pressure plate) 141 of the paper feeding tray 102, a semicircular roller (paper feeding roller) 143 configured to separate and feed the sheets 142 one by one from the sheet stacking unit (pressure plate) 141 and a separation pad 144 that is arranged to face the paper feeding roller 143 and is formed of a material having a large coefficient of friction are disposed. The separation pad 144 is pressed against the paper feeding roller 143.

As a conveyance unit for conveying the sheet 142 fed from the paper feeding unit at the bottom side of the printing head 134, disposed are a conveyance belt 151 configured to electrostatically attract and convey the sheet 142, a counter roller 152 configured to nip the sheet 142, which has been fed from the paper feeding unit through the guide 145, with the conveyance belt 151 to convey the sheet 142, a conveyance guide 153 configured to switch the direction of the sheet 142, which has been fed substantially vertically upwards, by substantially 90°, and place the sheet 142 on the conveyance belt 151, and an edge press roller 155 that is pressed against the conveyance belt 151 by a pressing member 154. Moreover, a charging roller 156, which is a charging unit configured to charge a surface of the conveyance belt 151, is disposed.

The conveyance belt 151 is an endless belt, is supported with a conveying roller 157 and a tension roller 158, and is capable of rotating in a belt conveying direction. The conveyance belt 151 includes, for example, a surface layer, which functions as a sheet adsorbing surface, and is formed of a resin material having a thickness of about 40 μm and resistance of which has not been controlled, such as an ETFE pure material, and a back layer (intermediate resistance layer, or earthing layer) formed of the same material to the surface layer, and resistance of which has been controlled with carbon. At the back side of the conveyance belt 151, a guide member 161 is provided corresponding to a region of printing performed by the printing head 134. As a discharging unit for discharging the sheet 142 printed by the printing head 134, provided are a separation claw 171 configured to separate the sheet 142 from the conveyance belt 151, and a paper ejection driving roller 172 and a paper ejection driven roller 173. At the bottom of the paper ejection driving roller 172, a paper ejection tray 103 is provided.

Figure 4:
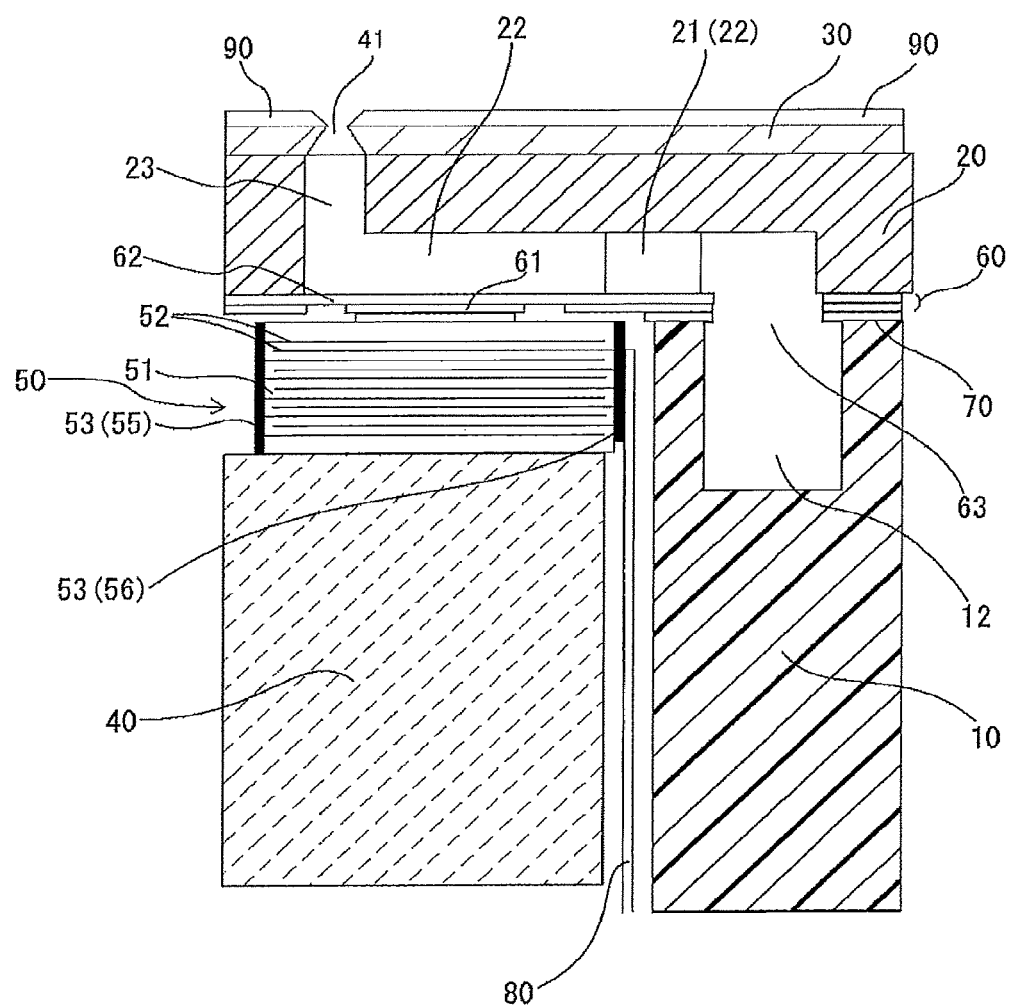
FIG. 4 is an element enlarged view illustrating one example of the inkjet head of the present disclosure.
Figure 5:
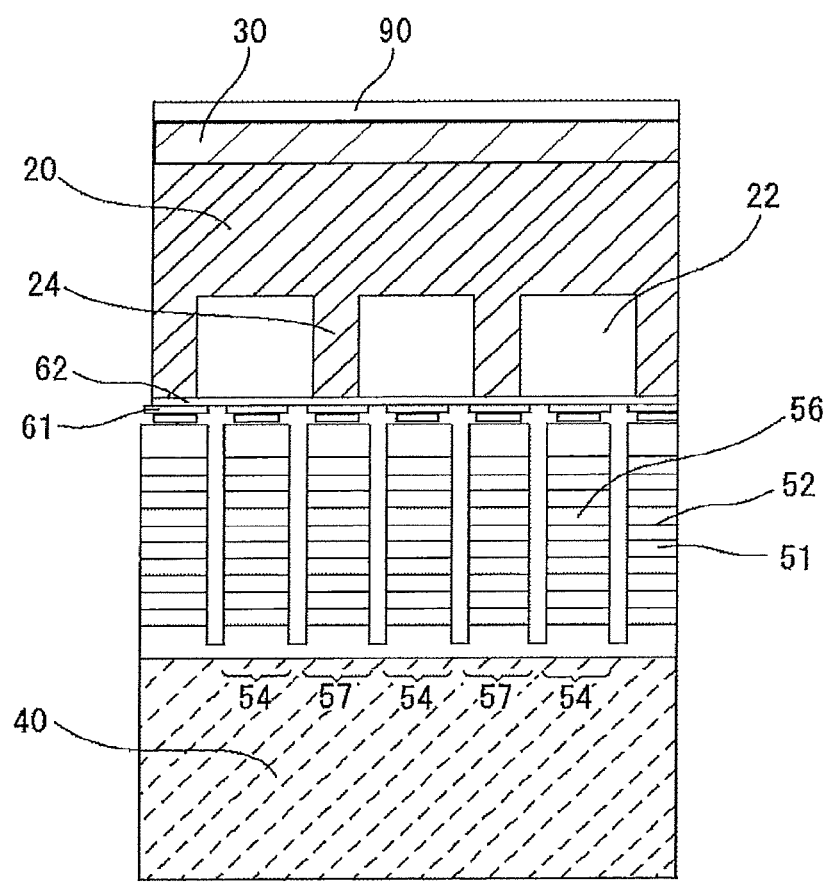
FIG. 5 is a main part enlarged view of an inter-channel direction of one example of the inkjet head of the present disclosure.

FIG. 4 is an element enlarged view illustrating one example of the inkjet head for use in the present disclosure. FIG. 5 is a main part enlarged view of an inter-channel direction of one example of the inkjet head.

The inkjet head includes a frame 10, in which a groove that is to be a common liquid chamber 12 with an ink supply opening (not illustrated) (configured to supply an ink in the direction from a front surface to the depth (the back surface direction of paper) of FIG. 5), a flow channel plate 20 to which a fluid resistance part 21, a groove that is to be a pressurizing liquid chamber 22, and a communicating opening 23 communicating to a nozzle 41 are formed, a nozzle plate 30 in which the nozzle 41 is formed, a vibration plate 60 including a convex part 61, a diaphragm part 62, and an ink flow inlet 63, a laminate piezoelectric element 50 adhered to the vibration plate 60 via an adhesive layer 70, and a base 40 to which the laminate piezoelectric element 50 has been fixed. The base 40 is formed of barium titanium-based ceramic and 2 lines of the laminate piezoelectric element 50 are arranged and adhered to the base 40.

In the laminate piezoelectric element 50, piezoelectric layers 51 of lead zirconate titanate (PZT) having a thickness of from 10 μm through 50 μm per layer and internal electrode layers 52 formed of silver/palladium (AgPd) having a thickness of several micrometers per layer are alternately laminated. Both edges of the internal electrode layer 52 are connected to external electrodes 53. The laminate piezoelectric element 50 is divided into comb shapes through half-cut dicing process, and the divided parts are respectively used as a driving part 56 and a support part 57 (non-driving part) (see FIG. 5).

A length of an outer edge of one [connecting to one edge of the internal electrode layer 52 at the front surface direction or depth direction (back surface direction of paper) of the drawing] of the 2 external electrodes 53 is controlled by a process, such as notching, in order to divide through a half-cut dicing processing, and the internal electrode layer 52 is turned into a plurality of individual electrodes 54. The other end is not divided by dicing and electrically conducted, and functions as a common electrode 55.

FPC80 is solder jointed to the individual electrode 54 of the driving part 56. Moreover, the common electrode 55 is jointed to the Gnd electrode of FPC80 by disposing an electrode layer at the edge of the laminate piezoelectric element 50 and wrapping the electrode layer around. A driver IC (not illustrated) is mounted in FPC80 and the driver IC controls application of driving voltage to the driving part 56.

The vibration plate 60 is formed through electroforming by laminating two Ni plated films having a thin film diaphragm part 62, an island-shaped convex part (island part) 61 that is jointed to the laminate piezoelectric element 50 that is formed at the center of the diaphragm part 62 and is to be a driving part 56, a thick film part including a beam to be jointed to a support part (not illustrated), and an opening that is to be an ink flow inlet 63. A thickness of the diaphragm part is 3 μm and a width thereof (one side) is 35 μm.

The joint between the island-shaped convex part 61 of the vibration plate 60 and the driving part 56 of the laminate piezoelectric element 50 and the joint between the vibration plate 60 and the frame 10 are adhered by patterning the adhesive layer 70 including a gap material.

As the flow channel plate 20, a monocrystalline silicon substrate is used, and the fluid resistance part 21, a groove that is to be a pressurizing liquid chamber 22, and an opening that is to be a communicating opening 23 at a position corresponding to the nozzle 41 are patterned through etching. The remained parts from the etching are partition walls 24 of the pressurizing liquid chamber 22. In the head, moreover, a part where an etching width is narrow is disposed and is used as a fluid resistance part 21.

The nozzle plate 30 is formed of a metal material (e.g., a Ni plating film formed by electroforming) and a large number of nozzles 41, which are fine discharge openings for discharging ink droplets, are formed in the nozzle plate 30. The inner shape (internal shape) of the nozzle 41 is a horn shape, an almost cylindrical shape, or an almost circular truncated cone shape, etc.

As diameters of the nozzles 41, diameters thereof at the ink droplet discharge side are 17 μm or greater but 19 μm or less. When the diameters are outside the above-mentioned range, discharge stability is low, and printing of high resolution without granularity, which is the object of the present disclosure, cannot be performed. Moreover, a pitch of nozzles of each line is 150 dpi.

An ink repellent layer 71 is disposed on an ink discharge surface (nozzle surface side) of the nozzle plate 30.

A material of the ink repellent layer 71 is not particularly limited as long as the material is a material that repels an ink. Examples of the material include silicone-based water repellent materials and fluorine-based water repellent materials.

Examples of the silicone-based water repellent materials include room temperature-curable liquid silicone resins or elastomers and ultraviolet ray-curable liquid silicone resins or elastomers. Examples of the fluorine-based water repellent materials include heat-curable liquid silicone resins or elastomers. Any of the above-listed materials is applied onto a base surface of the nozzle plate and is left in the atmosphere at room temperature to cure the material through polymerization, ultraviolet ray irradiation, or heating to form an ink repellent layer 71.

A viscosity of the silicone resin is preferably 1,000 mPa·s or less.

The silicone resin is a resin having, as a basic skeleton, a siloxane bond composed of Si and O. The silicone resin is commercially available in various forms, such as oil, resins, and elastomers. Other than ink repellency that is important for the present disclosure, the silicone resin has various characteristics, such as heat resistance, release properties, defoaming properties, and adhesion.

Examples of a commercial product of the silicone resin include room temperature-curable silicone resin, SR2411 (available from Dow Corning Toray Co., Ltd.).

In order to maintain sufficient ink repellency against an ink including a fluorine-based surfactant, moreover, the ink repellent layer 71 is preferably composed of a structure including a silicone resin and/or a fluorine resin. The structure including the silicone resin and/or the fluorine resin is composed of a silicone resin alone, a fluorine resin alone, or a mixture thereof with a constitutional component, such as another resin and a metal. Examples of the structure including the silicone resin and/or the fluorine resin include a structure where silicone resin particles are dispersed in a fluorine resin, a kneaded product of a silicone resin with polypropylene, and eutectoid plating of Ni with a silicone resin or a fluorine resin. A mixed body of a silicone resin and another constitutional component is effective for preventing dissolution of the silicone resin.

Apart from the above-described method for curing after coating and the above-described method of Ni eutectoid plating, as the method for forming the ink repellent layer 71 on a surface of the nozzle plate, there are also an electrode-position method of a fluorine resin, a vacuum vapor deposition method, and a method where silicone oil is polymerized through plasma polymerization.

When the ink repellent layer 71 is formed by a method other than the electrodeposition method, nozzle holes and a back surface of the nozzle plate are masked with a photoresist, a water-soluble resin, etc., the resist is stripped and removed after forming an ink repellent layer to thereby form the ink repellent layer only on a surface of the nozzle plate. However, the ink repellent layer may be damaged when a strong alkaline stripping liquid is used and therefore attention should be paid.

An average thickness of the ink repellent layer 71 is preferably 0.1 μm or greater but 5.0 μm or less and more preferably 0.1 μm or greater but 1.0 μm or less. When the average thickness is 0.1 μm or greater, resistance against wiping may not be deteriorated and reduction in ink repellency during a long-time use may not be caused. When the thickness is greater than 5.0 μm, moreover, the thickness is more than a necessary thickness, which increases a production cost.

Surface roughness (Ra) of the ink repellent layer 71 is preferably 0.2 μm or less. When the surface roughness is 0.2 μm or less, residues from wiping can be reduced.

In the inkjet head composed in the above-mentioned manner, a driving waveform (pulsed voltage of from 10V through 50V) is applied to the driving part 56 corresponding to a printing signal to cause a displacement of the driving part 56 in the laminate direction, and then the pressurizing liquid chamber 22 is pressurized via the vibration plate 60 to increase pressure thereof to thereby discharge ink droplets from the nozzle 41.

As the discharge of ink droplets is terminated, thereafter, the pressure of the ink inside the pressurizing liquid chamber 22 reduces and negative pressure is generated inside the pressurizing liquid chamber 22 due to inertia of a flow of the ink and the discharge process of the driving pulse to thereby move onto an ink replenish process. During the ink replenish process, the ink supplied from the ink tank is flown into the common liquid chamber 12, and the ink is supplied into the pressurizing liquid chamber 22 from the common liquid chamber 12 through the ink flow inlet 63 and the fluid resistance part 21.

The fluid resistance part 21 has an effect of damping residual pressure vibrations after discharging. On the other hand, the fluid resistance part 21 becomes a resistance against refilling performed using surface tension. A balance between damping of residual pressure and a duration of refilling can be met by appropriately selecting the fluid resistance part, and as a result, the time required to move onto the subsequent ink droplet discharge operation (driving period) can be shortened.

Figure 6:
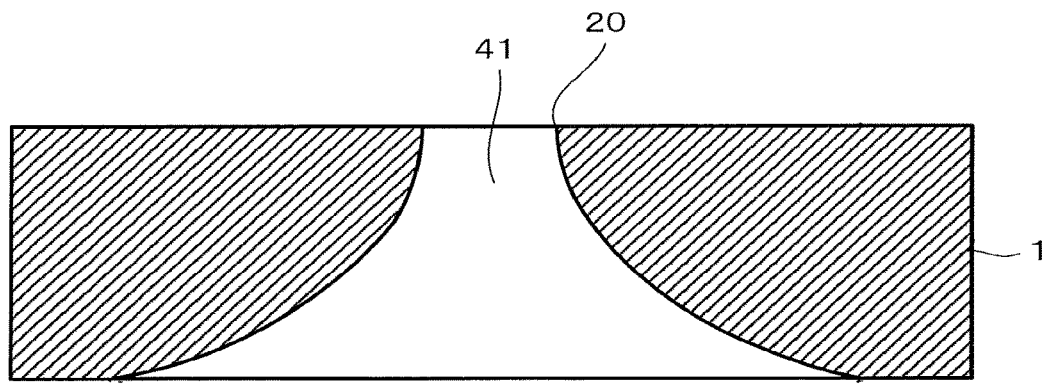
FIG. 6 is a cross-sectional view of nozzle holes formed in a nozzle plate of the inkjet head of the present disclosure.

The nozzle 41 illustrated in FIG. 6 can stably discharge small droplets, because a diameter of the nozzle 41 reduces from the ink inlet side from which the ink of the liquid chamber inflows to the ink-discharge side at which the flown ink is discharged in the nozzle plate 1 configured to discharge the ink inside the liquid chamber from the nozzle, and the nozzle 41 is formed in a manner that a cross-sectional shape thereof is a curved shape, and has a smoothly curved shape (round shape).

For example, Japanese Unexamined Patent Application Publication No. 2003-80716 can be referred to for such a nozzle.

<Ink Cartridge>

Figure 7:
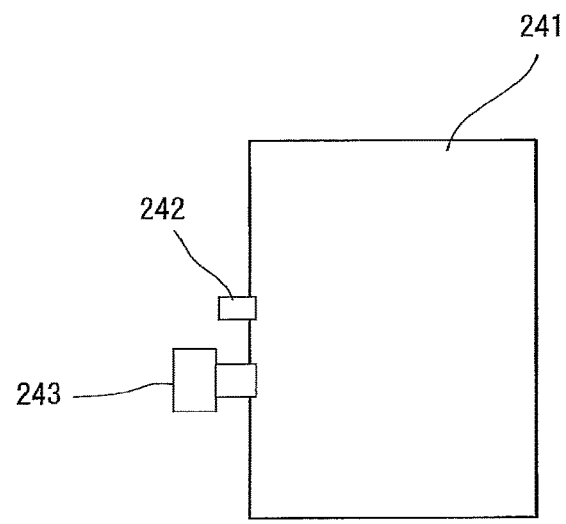
FIG. 7 is a schematic view illustrating one example of an ink cartridge for use in the present disclosure.
Figure 8:
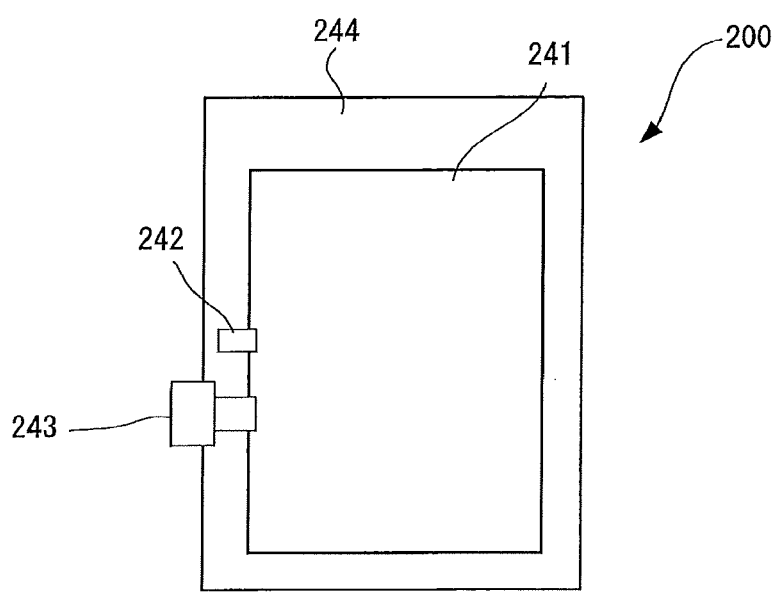
FIG. 8 is a schematic view of the ink cartridge of FIG. 7 including a case.

An ink cartridge for use in the present disclosure will be described with reference to FIGS. 7 and 8. FIG. 7 is a view illustrating one example of the ink cartridge. FIG. 8 is a view of the ink cartridge 200 of FIG. 7 including a case (exterior).

As illustrated in FIG. 7, an ink is inserted into an ink bag 241 from an ink injection opening 242 and the ink injection opening 242 is closed by fusion after removing air from the ink bag. At the time of use, a needle of the device main body is inserted into an ink outlet opening 243 formed of a rubber member to supply the ink to the device. The ink bag 241 is formed of a non-permeable wrapping member, such as an aluminium laminate film. As illustrated in FIG. 8, the ink bag 241 is typically housed in a plastic cartridge case 244, which is used by being detachably mounted in various inkjet printing apparatuses.

The ink cartridge can be used by being detachably mounted in an inkjet printing apparatus.

<Ink>

An ink (inkjet printing ink or aqueous dye ink) for use in the present disclosure includes a water-soluble dye, preferably further includes an organic solvent and water, and may further include other components according to the necessity.

—Water-Soluble Dye—

When a water-soluble dye is used as a colorant of the ink, vivid hue can be obtained and an image maintaining glossiness of a printing medium can be obtained. In the present specification, the term "water-soluble" means that the dye as a solid content dissolves in an amount of 1% by mass or greater in water.

Moreover, use of water-soluble dyes having high weather resistance for inks of cyan, magenta, yellow, and black that are the process colors can enhance durability of an image. Examples of the water-soluble dyes having high weather resistance include those disclosed in the following literatures.

Japanese Unexamined Patent Application Publication No. 2003-192930
Japanese Unexamined Patent Application Publication No. 2005-008868
The paragraphs [0016] to [0118] and [0132] to [0231] of Japanese Unexamined Patent Application Publication No. 2007-224274
The paragraphs [0025] to [0130], [0152] to [0182], and [0189] to [0259] of Japanese Unexamined Patent Application Publication No. 2009-062515
The paragraphs [0289] to [0305] of Japanese Unexamined Patent Application Publication No. 2012-193332
The paragraphs [0076] to [0087] of Japanese Patent No. 4783581
WO 2006/075706
WO 2009/060654

In addition to the above-mentioned water-soluble dyes, moreover, the following water-soluble dyes may be added as a complementary color for each color.

Examples of acid dyes and food dyes include: C.I. Acid Yellow 17, 23, 42, 44, 79, and 142; C.I. Acid Red 1, 8, 13, 14, 18, 26, 27, 35, 37, 42, 52, 82, 87, 89, 92, 97, 106, 111, 114, 115, 134, 186, 249, 254, and 289; C.I. Acid Blue 9, 29, 45, 92, and 249; C.I. Acid Black 1, 2, 7, 24, 26, and 94; C.I. Food Yellow 3 and 4; C.I. Food Red 7, 9, and 14; and C.I. Food Black 1 and 2.

Examples of direct dyes include: C.I. Direct Yellow 1, 12, 24, 26, 33, 44, 50, 120, 132, 142, 144, and 86; C.I. Direct Red 1, 4, 9, 13, 17, 20, 28, 31, 39, 80, 81, 83, 89, 225, and 227; C.I. Direct Blue 1, 2, 6, 15, 22, 25, 71, 76, 79, 86, 87, 90, 98, 163, 165, 199, and 202; and C.I. Direct Black 19, 22, 32, 38, 51, 56, 71, 74, 75, 77, 154, 168, and 171.

Examples of basic dyes include: C.I. Basic Yellow 1, 2, 11, 13, 14, 15, 19, 21, 23, 24, 25, 28, 29, 32, 36, 40, 41, 45, 49, 51, 53, 63, 465, 67, 70, 73, 77, 87, and 91; C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, and 112; C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, and 155; and C.I. Basic Black 2 and 8.

Examples of reactive dyes include: C.I. Reactive Black 3, 4, 7, 11, 12, and 17; C.I. Reactive Yellow 1, 5, 11, 13, 14, 20, 21, 22, 25, 40, 47, 51, 55, 65, and 67; C.I. Reactive Red 1, 14, 17, 25, 26, 32, 37, 44, 46, 55, 60, 66, 74, 79, 96, and 97; and C.I. Reactive Blue 1, 2, 7, 14, 15, 23, 32, 35, 38, 41, 63, 80, and 95.

As water-soluble dyes used for inks of intermediate hues, moreover, any of commercially available water-soluble dyes having hues of from yellow to orange and to red may be used alone or in combination.

Examples of the water-soluble dyes used for inks of intermediate hues include: C.I. Direct Orange 6, 8, 10, 26, 29, 39, 41, 49, 51, 62, and 102; C.I. Acid Orange 7, 8, 10, 33, 56, and 64; and C.I. Food Yellow 3, 4, and 5. Among the above-listed examples, C.I. Acid Orange 33 and C.I. Food Yellow 5 are preferable in view of hue and coloring.

An amount of the water-soluble dye (a total amount when two or more water-soluble dyes are used) relative to a total amount of the ink is preferably 1% by mass or greater but 10% by mass or less and more preferably 2% by mass or greater but 6% by mass or less. When the amount is within the above-mentioned range, a coloring power is obtained, lightfastness or ozone resistance is excellent, the dye is not precipitated, and discharge stability of inkjet is excellent. Moreover, the amount being 2% by mass or greater but 6% by mass or less is more preferable because granularity of a photograph is improved.

—Organic Solvent—

Examples of the organic solvent include polyvalent alcohols, polyvalent alcohol alkyl ethers, polyvalent alcohol aryl ethers, nitrogen-containing heterocyclic compounds, amides, amines, sulfur-containing compounds, propylene carbonate, and ethylene carbonate.

The organic solvent is preferably any of polyvalent alcohols having an equilibrium moisture content of 30% by mass or greater in an environment having a temperature of 23° C. and relative humidity of 80%. Specific examples thereof include 1,2,3-butanetriol (equilibrium moisture content: 38% by mass), 1,2,4-butanetriol (equilibrium moisture content: 41% by mass), glycerin (equilibrium moisture content: 49% by mass), diglycerin (equilibrium moisture content: 38% by mass), triethylene glycol (equilibrium moisture content: 39% by mass), tetraethylene glycol (equilibrium moisture content: 37% by mass), diethylene glycol (equilibrium moisture content: 43% by mass), and 1,3-butanediol (equilibrium moisture content: 35% by mass). The above-listed examples may be used alone or in combination. Among the above-listed examples, glycerin and 1,3-butanediol are preferable because of viscosity lowered once a moisture is included.

An amount of the organic solvent relative to a total amount of the ink is preferably 30% by mass or greater but 60% by mass or less and more preferably 35% by mass or greater but 55% by mass or less. When the amount is 30% by mass or greater, discharge stability is secured excellently and adherence of the waste ink is excellently prevented in an ink discharge device. When the amount is 60% by mass or less, moreover, solubility of the dye is excellent, discharge properties are excellent without precipitation of the dye, drying properties of the ink on paper are excellent, and color stability on gloss paper is excellent.

Moreover, an organic solvent having an equilibrium moisture content of less than 30% by mass in an environment having a temperature of 23° C. and relative humidity of 80% may be used in combination with the above-described organic solvent according to the necessity. Examples of the organic solvent having an equilibrium moisture content of less than 30% by mass in an environment having a temperature of 23° C. and relative humidity of 80% include polyvalent alcohols, polyvalent alcohol alkyl ethers, polyvalent alcohol aryl ethers, cyclic ethers, amines, amides, sulfur-containing compounds, propylene carbonate, and ethylene carbonate.

An amount of the organic solvent having an equilibrium moisture content of less than 30% by mass in an environment having a temperature of 23° C. and relative humidity of 80% relative to a total amount of the ink is preferably 30% by mass or less.

Examples of the polyvalent alcohols include ethylene glycol, polyethylene glycol, propylene glycol, dipropylene glycol, tripropylene glycol, polypropylene glycol, 3-methyl-1,3-butanediol, 1,5-pentanediol, 2-methyl-2,4-pentanediol, hexylene glycol, 1,6-hexanediol, 1,2,6-hexanetriol, trimethylol ethane, trimethylol propane, 3-methyl-1,3-hexanediol, and propylpropylene diglycol.

Examples of the polyvalent alcohol alkyl ethers include ethylene glycol monoethyl ether, ethylene glycol monobutyl ether, diethylene glycol monomethyl ether, diethylene glycol monoethyl ether, diethylene glycol monobutyl ether, ethylene glycol mono-2-ethylhexyl ether, propylene glycol monoethyl ether, and triethylene glycol dimethyl ether.

Examples of the polyvalent alcohol aryl ethers include ethylene glycol monophenyl ether and ethylene glycol monobenzyl ether.

Examples of the cyclic ethers include epoxys, oxetanes, tetrahydrofurans, tetrahydropyrans, and crown ether.

Examples of the amines include monoethanol amine, diethanol amine, triethanol amine, N,N-dimethylmonoethanolamine, N-methyldiethanolamine, N-methylethanolamine, N-phenylethanolamine, and 3-aminopropyldiethylamine.

Examples of the amide compounds include 2-pyrrolidone, N-methyl-2-pyrrolidone, 1,3-dimethyl-2-imidazolidinone, ε-caprolactam, γ-butyrolactone, β-methoxy-N,N-dimethylpropionamide, and ⊖-butoxy-N,N-dimethylpropionamide. The amide compound has a function of making a dye soluble and has an effect of preventing precipitation of crystals at the time of drying an ink. Note that, there are formamide, N-methylformamide, N,N-dimethylformamide, and N,N-diethylformamide as the amide compound, but use thereof is not preferable because of high toxicity.

Examples of the sulfur-containing compounds include dimethyl sulfoxide, sulfolane, and thiodiglycol.

—Water—

An amount of water in the ink is not particularly limited and may be appropriately selected. In view of drying properties and discharge reliability of an ink, the amount is preferably 10% by mass or greater but 90% by mass or less and more preferably 20% by mass or greater but 60% by mass or less.

—Other Components—

The above-mentioned other components are not particularly limited and may be appropriately selected. Examples thereof include a surfactant, a pH regulator, preservative and fungicide, a chelating reagent, a corrosion inhibitor, an antioxidant, an ultraviolet ray absorber, an oxygen absorber, a photostabilizer, and a water-soluble resin.

——Surfactant——

As the surfactant, any of silicone-based surfactants, fluorine-based surfactants, amphoteric surfactants, nonionic surfactants, and anionic surfactants can be used.

The silicone-based surfactants are not particularly limited and may be appropriately selected. Among the silicone-based surfactants, a silicone-based surfactant that is not decomposed with high pH is preferable. Examples of such a surfactant include side chain-modified polydimethylsiloxane, both terminal-modified polydimethylsiloxane, single terminal-modified polydimethylsiloxane, and side chain and both terminal-modified polydimethylsiloxane. The silicone-based surfactant including a polyoxyethylene group or a polyoxyethylene polyoxypropylene group as a modifying group is particularly preferable because the surfactant exhibits excellent characteristics as an aqueous surfactant. Moreover, a polyether-modified silicone-based surfactant can be also used as the silicone-based surfactant. Examples thereof include a compound in which a polyalkyleneoxide structure is introduced to a side chain of the Si site of dimethylsiloxane.

As the fluorine-based surfactant, for example, perfluoroalkyl sulfonic acid compounds, perfluoroalkyl carboxylic acid compounds, perfluoroalkyl phosphoric acid ester compounds, perfluoroalkyl ethylene oxide adducts, and polyoxyalkylene ether polymer compounds having a perfluoroalkyl ether group in a side chain thereof are particularly preferable because of low foamability. Examples of the perfluoroalkyl sulfonic acid compounds include perfluoroalkyl sulfonic acid and perfluoroalkyl sulfonic acid salt. Examples of the perfluoroalkyl carboxylic acid compounds include perfluoroalkyl carboxylic acid and perfluoroalkyl carboxylic acid salt. Examples of the polyoxyalkylene ether polymer compounds having a perfluoroalkyl ether group in a side chain include sulfuric acid ester salts of polyoxyalkylene ether polymer having a perfluoroalkyl ether group in a side chain thereof and salts of polyoxyalkylene ether polymer having a perfluoroalkyl ether group in a side chain thereof. Examples of counter ions of salts in the above-listed fluorine-based surfactants include Li, Na, K, $NH_4$, $NH_3CH_2CH_2OH$, $NH_2(CH_2CH_2OH)_2$, and $NH(CH_2CH_2OH)_3$.

Examples of the amphoteric surfactants include lauryl aminopropionic acid salts, lauryl dimethyl betaine, stearyl dimethyl betaine, and lauryl dihydroxyethyl betaine.

Examples of the nonionic surfactants include polyoxyethylene alkylphenyl ether, polyoxyethylene alkyl ester, polyoxyethylene alkyl amine, polyoxyethylene alkyl amide, polyoxyethylene propylene block polymers, sorbitan fatty acid ester, polyoxyethylene sorbitan fatty acid ester, and ethylene oxide adducts of acetylene alcohol.

Examples of the anionic surfactants include polyoxyethylene alkyl ether acetic acid salts, dodecyl benzene sulfonic acid salts, lauric acid salts, and salts of polyoxyethylene alkyl ether sulfate.

The above-listed surfactants may be used alone or in combination.

The silicone-based surfactant is not particularly limited and may be appropriately selected. Examples thereof include side chain-modified polydimethylsiloxane, both terminal-modified polydimethylsiloxane, single terminal-modified polydimethylsiloxane, and side chain and both terminal-modified polydimethylsiloxane. A polyether-modified silicone-based surfactant having a polyoxyethylene group or polyoxyethylene polyoxypropylene group as a modifying group is particularly preferable because of excellent characteristics thereof as an aqueous surfactant.

Such a surfactant may be appropriately synthesized for use or selected from commercial products. For example, the commercial products are readily available from Byc Chemie Japan Co., Ltd., Shin-Etsu Silicone Co., Ltd., Dow Corning Toray Co., Ltd., NIHON EMULSION Co., Ltd., and Kyoeisha Chemical Co., Ltd., etc.

The above-mentioned polyether-modified silicone-based surfactant is not particularly limited and may be appropriately selected. Examples thereof include a polyether-modified silicone-based surfactant represented by General Formula (S-1) in which a polyalkyleneoxide structure is introduced into a side chain of the Si site of dimethylpolysiloxane.

[General Formula (S-1)]

$$H_3C-\underset{\underset{CH_3}{|}}{\overset{\overset{CH_3}{|}}{Si}}-O-\left[\underset{\underset{CH_3}{|}}{\overset{\overset{CH_3}{|}}{Si}}-O\right]_m-\left[\underset{\underset{X}{|}}{\overset{\overset{CH_3}{|}}{Si}}-O\right]_n-\underset{\underset{CH_3}{|}}{\overset{\overset{CH_3}{|}}{Si}}-CH_3$$

$$X = -R(C_2H_4O)_a(C_3H_6O)_bR'$$

In General Formula (S-1) above, m, n, a, and b are integers, and each of R and R' is an alkyl group or an alkylene group.

As the above-mentioned polyether-modified silicone-based surfactant, a commercial product can be used. Examples of the commercial product include: KF-618, KF-642, and KF-643 (Shin-Etsu Chemical Co., Ltd.); EMALEX-SS-5602 and SS-1906EX (available form NIHON EMULSION Co., Ltd.); FZ-2105, FZ-2118, FZ-2154, FZ-2161, FZ-2162, FZ-2163, and FZ-2164 (available from Dow Corning Toray Silicone Co., Ltd.); BYK-33 and BYK-387 (available from BYK Japan K.K.); and TSF4440, TSF4452, and TSF4453 (available from Momentive Performance Materials Inc.). The above-listed examples may be used alone or in combination.

An amount of the surfactant in the ink is not particularly limited and may be appropriately selected. In view of excellent wettability and discharge stability and improvement of image quality, the amount is preferably 0.001% by mass or greater but 5% by mass or less and more preferably 0.05% by mass or greater but 5% by mass or less.

——Preservative and Fungicide——

The preservative and fungicide is not particularly limited. Examples of the preservative and fungicide include 1,2-benzisothiazolin-3-one.

——Corrosion Inhibitor——

The corrosion inhibitor is not particularly limited. Examples of the corrosion inhibitor include acid sulfite and sodium thiosulfate.

——pH Regulator——

The pH regulator is not particularly limited as long as the pH regulator can adjust the pH of the ink to 7 or higher. Examples of the pH regulator include amines, such as diethanol amine and triethanol amine.

——Chelating Reagent——

Examples of the chelating reagent include sodium ethylene diamine tetraacetate, sodium nitrilotriacetate, sodium hydroxyethylethylene diamine triacetate, sodium diethylene triamine pentaacetate, and sodium uramil diacetate.

——Antioxidant——

Examples of the antioxidant include phenol-based antioxidants (including hindered phenol-based antioxidants), amine-based antioxidants, sulfur-based antioxidants, and phosphorus-based antioxidants.

——Ultraviolet Ray Absorber——

Examples of the ultraviolet ray absorber include benzophenone-based ultraviolet ray absorbers, benzotriazole-based ultraviolet ray absorbers, salicylate-based ultraviolet ray absorbers, cyanoacrylate-based ultraviolet ray absorbers, and nickel complex salt-based ultraviolet ray absorbers.

——Water-Dispersible Resin——

A water-dispersible resin may be added to the ink. As the water-dispersible resin, a resin having excellent film formability (image formation properties) and equipped with high water repellency, high water resistance, and high weather resistance is effective for image printing of a high image density (high coloring ability) with high water resistance. Examples of such a resin include condensation-type synthetic resins, addition-type synthetic resins, and natural polymer compounds.

Particle diameters of the water-dispersible resin are related to a viscosity of a dispersion liquid. When a composition of the dispersion liquid is identical, as the particle diameters reduce, the viscosity increases with the same solid content. In order to prevent an excessively high viscosity when an ink is formed, a volume average particle diameter of the water-dispersible resin is desirably 50 nm or greater. When the volume average particle diameter is several tens micrometers, moreover, such a water-dispersible resin cannot be used because the particles are larger than nozzle openings of an inkjet head. The discharge properties of the ink is deteriorated when particles having large particle diameters are present in the ink even through the diameters of the particles are smaller than nozzle openings. Therefore, the volume average particle diameter is preferably 500 nm or less and more preferably 150 nm or less.

The water-dispersible resin has a function of fixing a colorant onto a surface of paper. It is expected that the water-dispersible resin forms a coating film at room temperature to improve fixing ability of the colorant. Therefore, the minimum film forming temperature (MFT) of the water-dispersible resin is preferably room temperature or lower and more preferably 20° C. or lower. When a glass transition temperature of the water-dispersible resin is −40° C. or lower, however, the resin coating film becomes highly viscous to generate tackiness on printed matter. Therefore, the glass transition temperature is preferably −30° C. or higher.

Use of the above-mentioned water-dispersible resin can improve fixing ability, water resistance, and gas resistance of an image, but glossiness may change depending on a printed medium for use because the water-dispersible resin is formed into a coating film. When a large amount of the water-dispersible resin is added, a coating film is formed at the time of drying meniscus of an inkjet head. Accordingly, an amount of the water-dispersible resin added to an ink is 5% by mass or less based on a resin solid content.

<Physical Properties of Ink>

The physical properties of the ink are not particularly limited and may be appropriately selected. A viscosity, static surface tension, etc. are preferably within the following ranges.

The viscosity of the ink at 25° C. is 5 mPa·s or greater but 12 mPa·s or less and preferably 6 mPa·s or greater but 10 mPa·s or less. When the viscosity of the ink is 5 mPa·s or greater, residual vibrations of the ink are unlikely to be generated during discharge and it is easy to control vibration after the discharge according to a driving waveform. As a result, a next discharge can be performed within a short period and therefore it is suitable for high-speed printing. When the viscosity of the ink is maintained to be 12 mPa·s or less, on the other hand, discharge properties are easily stabilized. Since the ink viscosity varies depending on the environment for use, it is preferable that the ink viscosity satisfy the above-mentioned range in expected environmental conditions for use.

For example, the viscosity of the ink can be measured by means of a viscometer (RE-550L, available from TOKI SANGYO CO., LTD.) with adjusting a temperature to 25° C.

Moreover, the static surface tension of the ink at 25° C. is preferably 30 mN/m or greater but 45 mN/m or less. When the static surface tension is within the above-mentioned range, droplets can be stably formed.

For example, the static surface tension of the ink can be measured at 25° C. by means of an automatic surface tensiometer (CBVP-Z, available from Kyowa Interface Science Co., Ltd.).

<Production Method of Ink>

The ink is produced by dispersing or dissolving in an aqueous medium a water-soluble dye, an organic solvent, water, and other components according to the necessity, and appropriately stirring and mixing. For example, the stirring and mixing can be performed by means of a sand mill, a homogenizer, a ball mill, a paint shaker, an ultrasonic wave disperser, etc. The stirring and mixing can be performed by a stirrer using a typical stirring blade, a magnetic stirrer, a high-speed disperser, etc.

<Print Medium>

A print medium applicable for the present disclosure is not particularly limited and may be appropriately selected. Examples of the print medium include plain paper, coated paper for printing, gloss paper, special paper, cloth, films, and OHP sheets. The above-listed examples may be used alone or in combination.

According to the present disclosure, an image without granularity can be obtained even when the ink is used on gloss-based media, such as gloss paper and coated paper for photographs. As the print medium, a print medium including a gloss layer disposed on an ink-accepting layer is preferable and a gloss-type medium, i.e., a print medium having a 20° gloss value and 60° gloss value of 10 or greater, is preferably used.

Examples of the gloss-type medium include gloss paper CRISPIA (available from SEIKO EPSON CORPORATION) having 20° gloss of 51.3 and 60° gloss of 65.0, and others, such as PM photograph sheets (available from SEIKO EPSON CORPORATION) and gloss films for Super Fine (available from SEIKO EPSON CORPORATION).

It is considered that granularity is recognized because of a result due to the fact that dots cannot be visually recognized and a result due to the impression received from a surface state of the print medium. It is assumed that the reason why the dots cannot be visually recognized is because a size of the dots is reduced, namely, a result of the presence or absence of occurrences of bleeding caused by an amount of droplets influenced by controlling a diameter of the nozzle, the ink, or a medium.

For impression of a surface state of a print medium, meanwhile, use of a gloss-type medium can, not only achieve smoothness of dots, but also give a shape of a dot to be formed close to a true circle. In addition, the shape of the dot has a small diameter and the dot has a tightened shape. Therefore, a dot per droplet is not easily recognized. The distinctiveness improves because image density per dot increases, but dots are not easily recognized because diameters of the dots become small. Therefore, an image without granularity can be obtained.

As one aspect of the inkjet printing method of the present disclosure, there is an inkjet printing method using, as a print medium, a print medium having a 20° gloss value and 60° gloss value of 10 or greater and satisfying the following elements (1) to (4):

(1) the inkjet printing method including an ink discharging step that includes discharging an ink to print an image;
(2) the inkjet discharging step using an inkjet head having a nozzle diameter of 17 μm or greater but 19 μm or less;
(3) the inkjet head including a nozzle plate and an ink repellent layer disposed on a surface of the nozzle plate; and
(4) the inkjet printing method using, as the ink, an aqueous dye ink including a water-soluble dye and having a viscosity of 5 mPa·s or greater but 12 mPa·s or less at 25° C.

<Printed Matter>

Printed matter obtained by the inkjet printing apparatus and inkjet printing method of the present disclosure has high image quality without blurring, has excellent glossiness, and can be suitably used for various applications, such as documents on which various letters and/or images are printed.

All of the terms "image formation," "recording," "printtyping," "printing," etc. used in the present disclosure are synonymous, and all of the terms "ink discharging" and "ink jetting" used in the present disclosure are synonymous.

EXAMPLES

The present disclosure will be described in more detail by ways of the following Examples, but the present disclosure should not be construed as being limited to these Examples.

(Preparation Example of Pigment Dispersion Liquid)

—Preparation of Cyan Pigment Dispersion Liquid—

A surfactant of the following formulation was dissolved in ion-exchanged water. To the resultant, a pigment is mixed to sufficiently wet the pigment. The resultant mixture was dispersed at 2,000 rpm for 2 hours by a wet disperser (DYNO-MILL KDL A, available from WAB) filled with zirconia beads having diameters of 0.5 mm, to thereby obtain a cyan pigment dispersion liquid. A cumulative 50% particle diameter (D50) of the pigment in the cyan pigment dispersion liquid was measured and the result was 78 nm. Note that, a particle size distribution measuring device (NANOTRACK UPA-EX150, available from Nikkiso Co., Ltd.) was used for the measurement of the cumulative 50% particle diameter (D50).

<Formulation of Pigment Dispersion Liquid>
  Phthalocyanine pigment (C.I. Pigment Blue 15:3, available from Dainichiseika Color & Chemicals Mfg. Co., Ltd.): 30.0 parts by mass
  Polyoxyethylene styrene phenyl ether (nonionic surfactant, NOIGEN EA-177 available from DKS Co., Ltd., HLB value=15.7): 10.0 parts by mass
  Ion exchanged water: 60.0 parts by mass Ink Preparation Examples 1 to 11

Each ink was prepared in the following manner using materials presented in each of the columns of Preparation Examples 1 to 11 of Table 1-1 and Table 1-2. In the tables, values are based on % by mass. For the dyes and pigments, a ratio of solids in the ink is presented. For other materials, a state of the product is presented. In the columns of the lowest line for the amount of the organic solvent, a total amount of organic solvents for use is presented.

Moreover, DISPANOL TOC and EMULGEN LS-106 are nonionic surfactants, Zonyl FSO-100 is a fluorine-based surfactant, and Proxel LV is an antifungal agent.

First, the organic solvent, the surfactant, and water were mixed and stirred for 30 minutes, followed by adding the dye aqueous solution or pigment dispersion liquid to the resultant mixture. To the resultant, balance of water was added to make a total being 100% by mass and the resultant mixture was stirred for 30 minutes. Thereafter, triethanol amine was added with monitoring pH of the ink and the resultant mixture was stirred to thereby adjust pH of the ink to 9. Subsequently, the resultant was subjected to pressure filtration with a cellulose acetate membrane filter having an average pore diameter of 0.2 μm to remove coarse particles to thereby obtain each ink.

TABLE 1-1

| | | Preparation Example | | | | | |
|---|---|---|---|---|---|---|---|
| | | 1 | 2 | 3 | 4 | 5 | 6 |
| Dye | C.I. Direct Black 168 | 5 | — | — | — | 6 | — |
| | C.I. Direct Blue 199 | — | 5 | — | — | — | 4 |
| | C.I. Acid Red 254 | — | — | 5 | — | — | — |
| | C.I. Food Yellow 3 | — | — | — | 5 | — | — |
| Pigment | Pigment Blue 15:3 | — | — | — | — | — | — |
| Organic solvent | 1,3-butanediol | 20 | — | 34 | — | 22 | 10 |
| | triethylene glycol | — | 22 | — | 13 | — | — |
| | glycerin | 8 | 11 | 17 | 10 | 11 | 20 |
| | triethylene glycol monobutyl ether | — | 12 | — | 15 | — | — |
| | 2-pyrrolidone | — | — | 6 | 5 | 6 | — |
| | imidazolidinone | — | — | — | — | 5 | — |
| | octane diol | 2 | — | 2 | — | 3 | — |
| Surfactant | DISPANOL TOC (available from NOF CORPORATION) | — | 1 | — | — | — | — |
| | EMULGEN LS-106 (available from Kao Corporation) | 1 | — | 0.8 | — | — | — |
| | Zonyl FSO-100 (available from DuPont) | — | — | — | — | 0.1 | — |
| Additives | triethanol amine | appropriate amount | appropriate amount | appropriate amount | appropriate amount | appropriate amount | appropriate amount |
| | Proxel LV (available from Lonza) | 0.1 | 0.1 | 0.1 | 0.1 | 0.1 | 0.1 |
| Water | | balance | balance | balance | balance | balance | balance |
| Total (% by mass) | | 100 | 100 | 100 | 100 | 100 | 100 |
| Organic solvent amount (% by mass) | | 30 | 45 | 59 | 43 | 47 | 30 |

TABLE 1-2

| | | Preparation Example | | | | |
|---|---|---|---|---|---|---|
| | | 7 | 8 | 9 | 10 | 11 |
| Dye | C.I. Direct Black 168 | — | — | — | 5 | — |
| | C.I. Direct Blue 199 | 4 | — | — | — | — |
| | C.I. Acid Red 254 | — | 5 | — | — | — |
| | C.I. Food Yellow 3 | — | — | 5.5 | — | — |
| Pigment | Pigment Blue 15:3 | — | — | — | — | 5 |
| Organic solvent | 1,3-butanediol | 8 | 35 | 35 | 18 | — |
| | triethylene glycol | — | — | — | — | 20 |
| | glycerin | 20 | 18 | 18 | 6 | 20 |
| | triethylene glycol | — | — | 5 | 1 | 8 |

TABLE 1-2-continued

|  |  | Preparation Example | | | | |
|---|---|---|---|---|---|---|
|  |  | 7 | 8 | 9 | 10 | 11 |
| | monobutyl ether | | | | | |
| | 2-pyrrolidone | — | 5 | — | — | 5 |
| | imidazolidinone | — | — | 3 | — | — |
| | octane diol | — | 3 | — | 3 | 2 |
| Surfactant | DISPANOL TOC (available from NOF CORPORATION) | 1 | — | 0.8 | — | 1 |
| | EMULGEN LS-106 (available from Kao Corporation) | — | — | — | 1 | — |
| | Zonyl FSO-100 (available from DuPont) | — | — | — | — | — |
| Additives | triethanol amine | appropriate amount | appropriate amount | appropriate amount | appropriate amount | appropriate amount |
| | Proxel LV (available from Lonza) | 0.1 | 0.1 | 0.1 | 0.1 | 0.1 |
| Water | | balance | balance | balance | balance | balance |
| Total (% by mass) | | 100 | 100 | 100 | 100 | 100 |
| Organic solvent amount (% by mass) | | 28 | 61 | 61 | 28 | 55 |

Properties of each of the inks were evaluated in the following manner. The results are presented in Table 2.

<Measurement of Viscosity>

A viscosity of the ink was measured at 25° C. by means of R-type viscometer (RE-550L, available from TOKI SANGYO CO., LTD.).

<Measurement of Static Surface Tension>

A static surface tension of the ink was measured at 25° C. by means of an automatic surface tensitometer (CBVP-Z, available from Kyowa Interface Science Co., Ltd.).

TABLE 2

|  | Preparation Example | | | | | | | | | | |
|---|---|---|---|---|---|---|---|---|---|---|---|
|  | 1 | 2 | 3 | 4 | 5 | 6 | 7 | 8 | 9 | 10 | 11 |
| Viscosity (mPa · s) | 5 | 8 | 12 | 8 | 9 | 6 | 5 | 12 | 13 | 4 | 9 |
| Static surface tension (mN/m) | 32 | 30 | 34 | 45 | 28 | 46 | 33 | 39 | 34 | 32 | 32 |

Examples 1 to 10 and Comparative Examples 1 to 5

An ink cartridge illustrated in FIGS. 7 to 8 was charged with each of the inks of Preparation Examples 1 to 11. An inkjet head produced by varying a nozzle diameter as presented in Table 3 was set in an inkjet printer (IPSiO G707, available form Ricoh Company Limited) having a structure illustrated in FIGS. 1 to 2 with the combination presented in Table 3, to thereby produce each of printers of Examples 1 to 10 and Comparative Examples 1 to 5.

The inkjet head included an ink repellent layer (silicone resin) formed on a nozzle substrate, where the ink repellent layer had an average thickness of 1 μm and the nozzle substrate was in the size of 40 mm (length)×23 mm (width), had an average thickness of 640 μm, and was formed of nickel.

In the nozzle substrate, 2 parallel lines of nozzle holes were disposed and 192 nozzle holes each having a nozzle diameter presented in Table 3 were aligned in each nozzle hole line. The nozzle holes in the line were disposed in a manner that a pitch of the nozzle holes next to each other was to be a distance equivalent to 150 dpi. Between the lines, the nozzle holes were disposed in the manner that the positions of the nozzle holes were sifted by a half-pitch (300 dpi). As a result, the nozzle holes were in the staggered arrangement with the 2 nozzle hole lines.

Used as the nozzle plate was, as illustrated in FIG. 6, a nozzle plate having a nozzle 41 formed in a manner that a diameter of the nozzle 41 reduced from the ink inlet side from which the ink of the liquid chamber inflowed to the ink-discharge side at which the flown ink was discharged and a cross-sectional shape thereof was a smooth round shape.

TABLE 3

| | Head nozzle diameter (μm) | Ink formulation |
|---|---|---|
| Ex. 1 | 17 | Preparation Ex. 1 |
| Ex. 2 | 18 | Preparation Ex. 2 |
| Ex. 3 | 19 | Preparation Ex. 3 |
| Ex. 4 | 17 | Preparation Ex. 3 |
| Ex. 5 | 19 | Preparation Ex. 1 |
| Ex. 6 | 18 | Preparation Ex. 4 |
| Ex. 7 | 17 | Preparation Ex. 5 |
| Ex. 8 | 18 | Preparation Ex. 6 |
| Ex. 9 | 18 | Preparation Ex. 8 |
| Ex. 10 | 18 | Preparation Ex. 7 |
| Comp. Ex. 1 | 16 | Preparation Ex. 2 |
| Comp. Ex. 2 | 20 | Preparation Ex. 4 |
| Comp. Ex. 3 | 18 | Preparation Ex. 9 |
| Comp. Ex. 4 | 18 | Preparation Ex. 10 |
| Comp. Ex. 5 | 19 | Preparation Ex. 11 |

Continuous discharge properties and intermittent discharge properties were examined in the following manner using each of the printers of Examples and Comparative Examples above with adjusting a driving frequency of the inkjet head to 5 kHz and a size of the ink droplet to 1 pL.

(1) Evaluation of Continuous Discharge Properties

The head was fixed in the middle of the main-scanning direction of the printer and a camera was set to observe a discharge state. In this state, continuous discharge was performed for 10 minutes and a displacement of the landing position 1 mm away from an edge of the head was evaluated based on the following criteria. The results are presented in Table 4.

[Evaluation Criteria]
A: No displacement from the initial position.
B: The displacement from the initial position was 15 μm or less.
C: The displacement from the initial position was greater than 15 μm.

(2) Evaluation of Intermittent Discharge Properties

After sliding the head the predetermined number of returns (idle scanning) in the main-scanning direction of the printer without discharging the ink, ink droplets were printed on gloss paper CRISPIA (available from SEIKO EPSON CORPORATION) (20° gloss: 51.3 and 60° gloss: 65.0) in the same state as in (1) above. The number of idle scans at which there was a difference from the normal state was evaluated based on the following criteria. The results are presented in Table 4.

[Evaluation Criteria]
A: The number of idle scans with which the discharge was performed normally was 30 times or greater.
B: The number of idle scans with which the discharge was performed normally was 10 times or greater but less than 30 times.
C: The number of idle scans with which the discharge was performed normally was less than 10 times.

(3) Evaluation of Ink Deposition Amount

By means of each of the printers of Examples and Comparative Examples above, a driving frequency of the inkjet head was set to 5 kHz and a waveform was set in a manner that the ink could be stably discharged with an amount of a small droplet being from 0.5 pl through 2.0 pl. A solid image of 1,200 dpi×1,200 dpi was printed on super fine paper (available from SEIKO EPSON CORPORATION) with a stable large droplet waveform. The weight of the ink deposited was evaluated based on the following criteria. The results are presented in Table 4.

[Evaluation Criteria]
A: The ink deposition amount was 8 mg/m² or greater.
B: The ink deposition amount was 6 mg/m² or greater but less than 8 mg/m².
C: The ink deposition amount was less than 6 mg/m².

(4) Evaluation of Ganularity

By means of each of the printers of Examples and Comparative Examples above, a driving frequency of the inkjet head was set to 5 kHz and a waveform was set in a manner that the ink could be stably discharged with an amount of a small droplet being from 0.5 pl through 2.0 pl. A solid image of 1,200 dpi×1,200 dpi with printing duty of 5% was printed on gloss paper CRISPIA (available from SEIKO EPSON CORPORATION) with a stable small droplet waveform. The obtained image was visually confirmed with a distance from the eyes being 10 cm under indoor light and evaluated based on the following criteria. The results are presented in Table 4.

[Evaluation Criteria]
A: No particle was observed in the image, no rough texture was recognized, and there was no granularity.
B: No particle was observed in the image, but rough texture was slightly recognized.
C: Particles were observed in the image, rough texture was recognized, and there was granularity.

TABLE 4

| | Continuous discharge properties | Intermittent discharge properties | Ink deposition amount mg/m² | Judgement | Granularity |
|---|---|---|---|---|---|
| Ex. 1 | A | A | 9.6 | A | A |
| Ex. 2 | A | A | 8.9 | A | A |
| Ex. 3 | A | A | 9.0 | A | A |
| Ex. 4 | A | A | 7.2 | B | A |
| Ex. 5 | A | A | 11.9 | A | B |
| Ex. 6 | A | A | 8.9 | A | A |
| Ex. 7 | B | A | 7.6 | B | A |
| Ex. 8 | B | B | 9.8 | A | A |
| Ex. 9 | B | A | 7.1 | B | A |
| Ex. 10 | B | A | 10.7 | A | B |
| Comp. Ex. 1 | C | B | 5.4 | C | A |
| Comp. Ex. 2 | C | C | 8.5 | A | C |
| Comp. Ex. 3 | C | B | 4.1 | C | A |
| Comp. Ex. 4 | C | C | 10.3 | A | C |

As it is understood from the results of Table 4, Examples 1 to 6 are particularly preferable examples and discharge stability thereof is excellent. Moreover, Examples 7 to 10 are examples where a surface tension is not in the range of from 30 mN/m through 45 mN/m or the amount of the organic solvent is not in the range of from 30% by mass through 60% by mass, and discharge stability thereof is slightly inferior to Examples 1 to 6, but it is on the practical level.

Meanwhile, Comparative Examples 1 to 5 have discharge stability that is on such a level that cannot be applied for practical use. Particularly Comparative Example 5 could not discharge satisfactorily and the result thereof was worse than "C." Therefore, Comparative Example 5 is not presented in Table 4.

For example, embodiments of the present disclosure are as follows.
<1> An inkjet printing apparatus, satisfying elements (1) through (4) below,
(1) the inkjet printing apparatus including an ink discharging unit configured to discharge an ink,
(2) the ink discharging unit including an inkjet head having a nozzle diameter of 17 μm or greater but 19 μm or less,
(3) the inkjet head including a nozzle plate and an ink repellent layer disposed on a surface of the nozzle plate, and
(4) the inkjet printing apparatus using, as the ink, an aqueous dye ink including a water-soluble dye and having a viscosity of 5 mPa·s or greater but 12 mPa·s or less at 25° C.
<2> The inkjet printing apparatus according to <1>, wherein the ink repellent layer includes a silicone-based water repellent material.
<3> The inkjet printing apparatus according to <1> or <2>, wherein the nozzle plate has a nozzle formed in a manner that a diameter of the nozzle reduces from an ink inlet side from which the ink inside a liquid chamber inflows to an ink-discharge side from which the flown ink is discharged, and a cross-sectional shape of the nozzle is a curved shape.
<4> The inkjet printing apparatus according to any one of <1> to <3>,
wherein a static surface tension of the ink at 25° C. is 30 mN/m or greater but 45 mN/m or less.
<5> The inkjet printing apparatus according to any one of <1> to <4>,
wherein the ink includes an organic solvent and an amount of the organic solvent in the ink is 30% by mass or greater but 60% by mass or less relative to a total amount of the ink.

<6> The inkjet printing apparatus according to <5>, wherein the organic solvent is polyvalent alcohol having an equilibrium moisture content of 30% by mass or greater in an environment having a temperature of 23° C. and relative humidity of 80%.

<7> The inkjet printing apparatus according to any one of <1> to <6>,
wherein 4 color inks including black, cyan, magenta, and yellow are used as the ink.

<8> An inkjet printing method satisfying elements (1) through (4) below,
(1) the inkjet printing method including an ink discharging step that includes discharging an ink to print an image,
(2) the inkjet discharging step using an inkjet head having a nozzle diameter of 17 µm or greater but 19 µm or less,
(3) the inkjet head including a nozzle plate and an ink repellent layer disposed on a surface of the nozzle plate, and
(4) the inkjet printing method using, as the ink, an aqueous dye ink including a water-soluble dye and having a viscosity of 5 mPa·s or greater but 12 mPa·s or less at 25° C.

<9> The inkjet printing method according to <8>,
wherein the ink repellent layer includes a silicone-based water repellent material.

<10> The inkjet printing method according to <8> or <9>, wherein the nozzle plate has a nozzle formed in a manner that a diameter of the nozzle reduces from an ink inlet side from which the ink inside a liquid chamber inflows to an ink-discharge side from which the flown ink is discharged, and a cross-sectional shape of the nozzle is a curved shape.

<11> The inkjet printing method according to any one of <8> to <10>,
wherein a static surface tension of the ink at 25° C. is 30 mN/m or greater but 45 mN/m or less.

<12> The inkjet printing method according to any one of <8> to <11>,
wherein the ink includes an organic solvent and an amount of the organic solvent in the ink is 30% by mass or greater but 60% by mass or less relative to a total amount of the ink.

<13> The inkjet printing method according to <12>, wherein the organic solvent is polyvalent alcohol having an equilibrium moisture content of 30% by mass or greater in an environment having a temperature of 23° C. and relative humidity of 80%.

<14> The inkjet printing method according to any one of <8> to <13>,
wherein the ink is composed of 4 color inks including black, cyan, magenta, and yellow.

The inkjet printing apparatus according to any one of <1> to <7> and the inkjet printing method according to any one of <8> to <14> can solve the above-mentioned various problems existing in the art and can achieve the object of the present disclosure.

What is claimed is:

1. An inkjet printing apparatus, satisfying the following elements (1) through (4):
   (1) the inkjet printing apparatus including an ink discharging unit configured to discharge an ink,
   (2) the ink discharging unit including an inkjet head having a nozzle diameter of 17 µm to 19 µm,
   (3) the inkjet head including a nozzle plate and an ink repellent layer disposed on a surface of the nozzle plate, and
   (4) the inkjet printing apparatus using, as the ink, an aqueous dye ink comprising a water-soluble dye and having a viscosity of 5 mPa·s to 12 mPa·s at 25° C.

2. The inkjet printing apparatus according to claim 1, wherein the ink repellent layer comprises a silicone-based water repellent material.

3. The inkjet printing apparatus according to claim 1, wherein the nozzle plate has a nozzle formed in a manner that a diameter of the nozzle reduces from an ink inlet side from which the ink inside a liquid chamber inflows to an ink-discharge side from which the flown ink is discharged, and a cross-sectional shape of the nozzle is a curved shape.

4. The inkjet printing apparatus according to claim 1, wherein a static surface tension of the ink at 25° C. is from 30 mN/m to 45 mN/m.

5. The inkjet printing apparatus according to claim 1, wherein the ink comprises an organic solvent and an amount of the organic solvent in the ink is from 30% by mass to 60% by mass relative to a total amount of the ink.

6. The inkjet printing apparatus according to claim 5, wherein the organic solvent is polyvalent alcohol having an equilibrium moisture content of 30% by mass or greater in an environment having a temperature of 23° C. and relative humidity of 80%.

7. The inkjet print apparatus according to claim 5, wherein the organic solvent is at least one selected from the group consisting of 1,3-butanediol, triethylene glycol, glycerin, triethylene glycol monobutyl ether, 2-pyrrolidone, imidazolidinone, and octane diol.

8. The inkjet printing apparatus according to claim 7, wherein four color inks including black, cyan, magenta, and yellow are used as the ink.

9. The inkjet printing apparatus according to claim 1, wherein 4 color inks including black, cyan, magenta, and yellow are used as the ink.

10. An inkjet printing method satisfying the following elements (1) through (4):
    (1) the inkjet printing method including an ink discharging step that includes discharging an ink to print an image,
    (2) the ink discharging step using an inkjet head having a nozzle diameter of 17 µm to 19 µm,
    (3) the inkjet head including a nozzle plate and an ink repellent layer disposed on a surface of the nozzle plate, and
    (4) the inkjet printing method using, as the ink, an aqueous dye ink comprising a water-soluble dye and having a viscosity of 5 mPa·s to 12 mP·s at 25° C.

11. The inkjet printing method according to claim 10, wherein the ink repellent layer comprises a silicone-based water repellent material.

12. The inkjet printing method according to claim 10, wherein the nozzle plate has a nozzle formed in a manner that a diameter of the nozzle reduces from an ink inlet side from which the ink inside a liquid chamber inflows to an ink-discharge side from which the flown ink is discharged, and a cross-sectional shape of the nozzle is a curved shape.

13. The inkjet printing method according to claim 10, wherein a static surface tension of the ink at 25° C. is from 30 mN/m to 45 mN/m.

14. The inkjet printing method according to claim 10, wherein the ink comprises an organic solvent and an amount of the organic solvent in the ink is from 30% by mass to 60% by mass relative to a total amount of the ink.

15. The inkjet printing method according to claim 14, wherein the organic solvent is polyvalent alcohol having an equilibrium moisture content of 30% by mass or greater in an environment having a temperature of 23° C. and relative humidity of 80%.

16. The inkjet printing method according to claim 10, wherein the ink is composed of 4 color inks including black, cyan, magenta, and yellow.

* * * * *